May 3, 1966

KIYOSHI INOUE 3,249,832

VARIABLE CAPACITOR

Filed May 26, 1964

KIYOSHI INOUE
INVENTOR.

BY Karl F. Ross

AGENT

May 3, 1966  KIYOSHI INOUE  3,249,832
VARIABLE CAPACITOR

Filed May 26, 1964  3 Sheets-Sheet 3

KIYOSHI INOUE
INVENTOR.

BY Karl G. Ross
AGENT

United States Patent Office 3,249,832
Patented May 3, 1966

3,249,832
VARIABLE CAPACITOR
Kiyoshi Inoue, 182 3-chome, Tamagawayoga-machi,
Setagaya-ku, Tokyo, Japan
Filed May 26, 1964, Ser. No. 370,202
Claims priority, application Japan, May 27, 1963,
38/27,309
13 Claims. (Cl. 317—245)

My present invention relates to variable capacitors and, more particularly, to an improved variable capacitor having juxtaposed charge-retaining surfaces separated by a dielectric gap and adapted to be moved toward and away from one another.

Variable capacitors of this type have been known heretofore and generally included two or more arrays of plates spaced apart by respective air (i.e., dielectric) gaps, the widths of which were varied by rotating one of the sets of plates with respect to the other set. The disadvantages of capacitors of this type are well known and may be summarized briefly as nonlinearities and irregularities arising from changes in the dimensions of the air gap with respect to relative orientation of the sets of plates. Moreover, such systems are considered unstable at certain critical dimensions of the air gap. To avoid these difficulties, it has been proposed to provide insulating disks of uniform dielectric constant between the charge-retaining plates. The latter are in contact with the solid insulators to avoid the incursion of a gaseous dielectric between their juxtaposed surfaces. Capacitors of this type, too, are found to be inconvenient, particularly for high-frequency operations, as a consequence of electrical contact potentials and electromotive forces arising from frictional interengagement of the movable set of plates with the dielectric disks. These latter potentials produce spurious electrical noise interfering with the signals in radio reception, transmission and similar high-frequency applications.

It is an object of the present invention, therefore, to provide an improved variable capacitor adapted to be used in high-frequency circuits and wherein the disadvantages characterizing the earlier capacitors mentioned above are obviated.

A more specific object of this invention is to provide a variable capacitor adapted to generate a minimum of electrical noise.

I found that these objects, and others which will become apparent hereinafter, can be obtained by providing a variable capacitor which includes an assembly of at least one pair of spacedly juxtaposed condenser plates (i.e. having confronting charge-retaining surfaces separated by a gaseous or even sold dielectric), one plate at least of each pair being of generally undulating configuration and approaching the other plate at spaced-apart locations. Preferably, however, both of the plates of each pair are of undulating configuration and approach one another at these locations which can correspond to peaks of one plate and troughs of the other so that a more or less honeycombed assembly is produced. The undulations render the plate resiliently deformable upon compression transversely of their major dimensions (i.e., length and width) so that the entire assembly can be selectively compressed and distended in this transverse direction by suitable capacitance-control means.

It should be noted at this juncture, that an "undulating" plate configuration is one in which the peaks and troughs are formed by angularly adjoining surfaces of the plate or are arcuate as in the manner of sawteeth and corrugations, respectively. Moreover, the troughs and peaks of the plate may have a smooth sinuous appearance in profile, a triangular cross-section, or a generally trapezoidal cross-section as may be required. These shapes are all to be considered within the scope of the instant invention and to be interchangeable for the purposes thereof. A generally triangular profile for the peaks and troughs is, however, found to provide capacitor assemblies of high linearity.

According to a more specific feature of the present invention, spacer means is interposed between the plates at least at the said locations of closest approach, such spacer means being of insulating or dielectric material. It is an important aspect of this invention that the spacer means for each pair of plates be generally planar; thus, the spacer means can include a plurality of spacer members, longitudinally extending along the corrugations, disposed at the locations of closest approach in a coplanar array with the members being relatively shiftable in their respective plane upon compression and distension of the assembly. While only a single pair of plates may be provided, it will be understood that, for most purposes, a stack of such pairs will be required to form the assembly, with each pair of plates being separated from the plates of an adjacent pair by similar spacer members.

According to still another feature of this invention, the peak and trough portions of approaching plates can be arcuately concave in the direction of one another to define seating surfaces for the spacer members, the latter being constituted of cylindrical rods of a material with a high dielectric constant (e.g., a vitreous substance such as glass or ceramic or a synthetic resin such as polystyrene). Additionally, housing means can at least partly enclose the assembly and form an abutment against which the assembly can be compressed. The capacitance-control means may then include a source of pressure fluid and a bladder in the housing for selectively compressing the assembly and, in the event that the housing is hermetically sealed, for compressing a dielectric gas therein. This, of course, varies the dielectric constant of the ambient gas. The ambient gas can be hydrogen while the pressure fluid is air or nitrogen, a throttle valve being provided in the conduit means connecting the source with the bladder.

Alternatively, the housing can include a force-transmitting element (e.g., a wall of the housing) provided with suitable screw means for displacing it to compact the assembly. In one particularly convenient construction, however, the housing is provided with a ramp spaced from but inclined toward the force-transmitting member and upon which a plurality of spaced rollers of different diameters can be shifted by a flexible element, such as the usual dial cord of a radio receiver, transmitter or other electronic device. When a screw is employed, the indicating means can include a scale on one part of the housing and an index on another or a vernier-dial index means rotatably connected with the screw. When the flexible element is employed, however, it is preferable to provide the index means on this element for co-operation with a suitable scale. Fluid-pressure control means can include a gauge responsive to fluid pressure in the bladder and reading directly in capacitance.

The plates may be composed of nickel, aluminum, tantalum or titanium and alloys thereof (e.g. nickel-aluminum or tantalum-titanium alloys), or from copper, steel and chromium alloys. The thickness of the plates may range from 0.005 to about 0.05 mm.

The above and other objects, features and advantages of the present invention will become more readily apparent from the following description, reference being made to the accompanying drawing in which.

Figure 1:
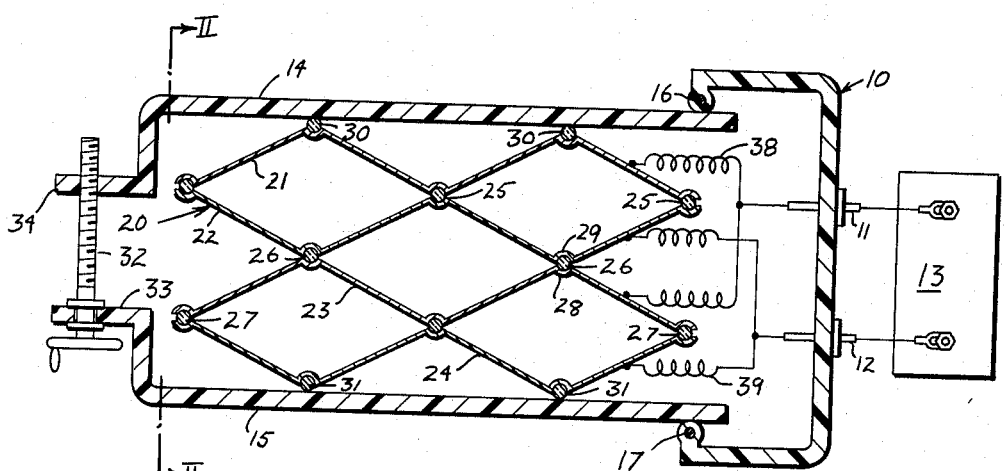
FIG. 1 is a cross-sectional view through a variable capacitor, according to the present invention, taken transversely to the spacer rods or members.
Figure 2:
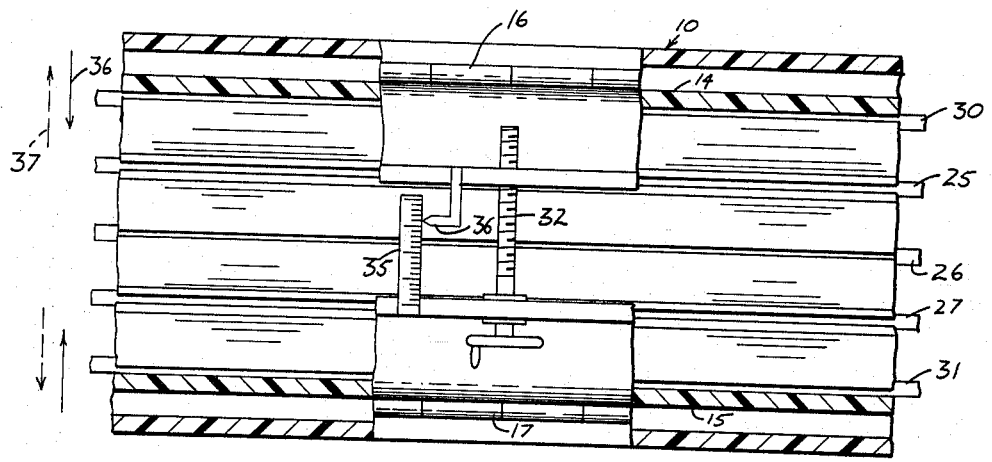
FIG. 2 is a cross-sectional view taken along the line II—II of FIG. 1, partly in side elevation to show the indicating means.

In FIGS. 1 and 2, I show a variable capacitor whose housing 10 is composed of insulating material and is provided with a pair of feed-through terminals 11, 12 which are connected with the terminal strip 13. The housing further comprises a pair of relatively movable walls 14, 15 hinged to housing portion 10 at 16, 17 and sandwiching between them the capacitor assembly 20. The latter consists of pairs of undulating condenser plates 21, 22, 23 and 24, approaching one another at coplanar spaced-apart locations at which they are separated by spacer rods 25, 26 and 27 lying in respective planes parallel to the corrugations, here shown to have planar sides. At their junctions, the undulating plates are formed with confronting concave seats 28, 29 which embrace the rods 25–27, the latter being of glass or polystyrene. Other sets of rods 30, 31 are provided between the plates 21 and 24 and the respective housing portions 14 and 15. It will be noted that the rods are substantially freely shiftable in their respective planes to allow the assembly to be compressed against the inherent resilient restoring force of the respective plates. The control means for this purpose includes a manually operable screw 32 rotatable in a flange 33 of the lower portion 15 of the housing and threadedly engaging a flange 34 to draw the housing portions 14 and 15 together and thereby compress the assembly 20. The flanges 33, 34 are provided respectively with a scale 35 and an index member 36, co-operating therewith, for yielding a visual indication of the degree of compaction of the assembly and thus the capacitance thereof. The screw 32 compresses the assembly in the direction of the arrows 36 while the assembly tends to restore itself to its original dimensions in the direction of arrow 37.

Figure 3:
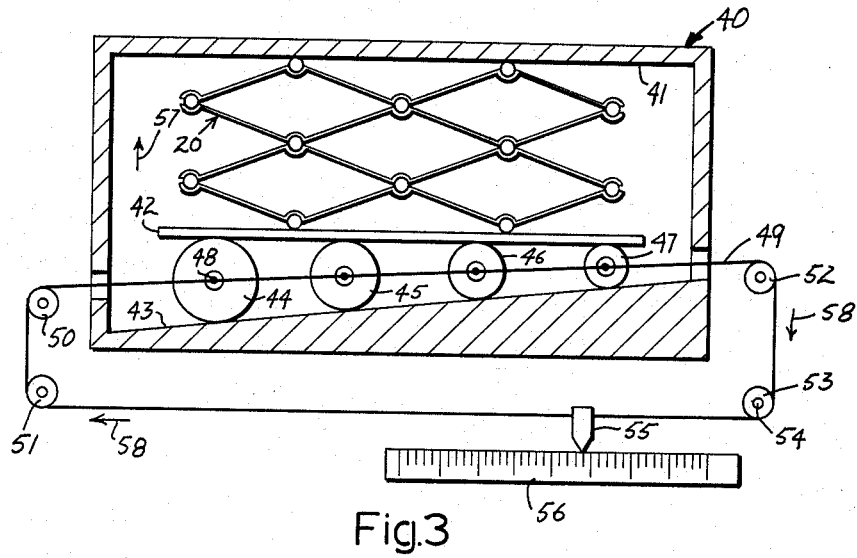
FIG. 3 is a view similar to FIG. 1 of another embodiment of the invention.

In the embodiment illustrated in FIG. 3, the housing 40 forms an abutment surface 41 against which the aforedescribed assembly 20 of undulating condenser plates can be compressed by a force-transmitting element 42. Although the means for connecting the plates of assembly 20 in an electric circuit are not illustrated in this embodiment, it should be noted that such means may include coiled leads 38 and 39 flexibly connecting the plates 21 and 23 with the positive terminal of strip 13 and the plates 22 and 24 with the negative terminal as shown in FIG. 1. In that case, housing 40 can be composed of an insulating material. The housing 40, moreover, is provided with an inclined ramp 43 spaced from but converging toward the force-transmitting member 42 and constituting part of the capacitance-control means of the present invention. A plurality of rollers 44, 45, 46, 47 of progressively increasing diameters are interposed between the ramp 43 and the force-transmitting member 42 in spaced relationship, these rollers being journaled upon their respective axles 48. Each of the axles 48 is engaged by a flexible element 49 (e.g. a dial cord of the usual type found in radio receivers) passing over idler pulleys 50, 51 and 52 and driven by a pulley 53 whose actuating shaft 54 can be provided with a conventional tuning knob. The flexible element 49 carries an indexing pointer 55 co-operating with a fixed scale to indicate the degree of movement of the rollers 44–47 upwardly along the ramp and thus the degree of compaction of the assembly 20 in the direction of arrow 57 when the flexible cord 49 is displaced in the direction of arrow 58. It should be noted that it is preferable for the diameter of pulleys 44–47 to be stepped in accordance with the angle of convergence of the force-transmitting plate 42 and the ramp 43 so that this plate is always parallel to the planes of the spacer rods or members as indicated previously.

Figure 4:
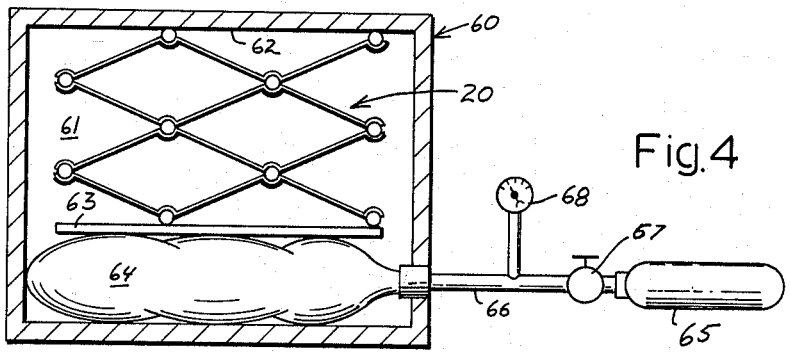
FIG. 4 is a cross-sectional view taken transversely to the spacer rods through a variable capacitor operated with fluid pressure.

FIG. 4 shows another embodiment of the present invention wherein the hermetically sealed, insulating housing 60 received the assembly 20 and can be provided with feed-through insulators as previously described and, therefore, not illustrated anew herein. The housing 60 forms a chamber 61 receiving a compressible gas such as hydrogen at an initial pressure of, for example, 20 kg./cm.$^2$, this gas filling the gaps between the electrode plates of the assembly 20. The housing 60 forms an abutment 62 against which the assembly 20 is compressible and includes a force-transmitting member 63 displaceable transversely to its plane by a bladder 64. The latter can be inflated with nitrogen at selectively variable pressures ranging between 4 and 14 kg./mm.$^2$, for example, by fluid under pressure from a source 65 such as a gas tank. The conduit means 66, connecting the source 65 with bladder 64, includes a throttle valve 67 for regulating the pressure and communicates with a gauge 68 indicating the fluid pressure within the bladder and thus the degree of compaction of the assembly 20. This gauge is calibrated directly in capacitance. Valve 67 can be of the venting type to bleed fluid from the bladder and thus permit the assembly 20 to distend and alter the capacitance.

Figure 5:
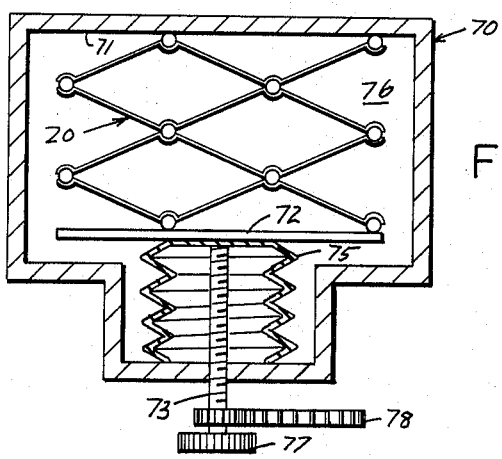
FIG. 5 is a view similar to FIG. 1 of a variable capacitor controlled by a screw.

In the embodiment of FIG. 5, the housing 70 again forms an abutment 71 against which the assembly 20 is compressed via a force-transmitting member 72. The screw 73 for controlling the capacitance of the unit is surrounded by a bellows-type seal 75 to prevent the escape of fluid under pressure from chamber 76.

This fluid may be hydrogen as mentioned above. Screw 73 has a knob 77 and is coupled with a conventional vernier dial 78 to provide a visual indication of the degree of compaction of the assembly and thus the capacitance thereof.

Figure 6:
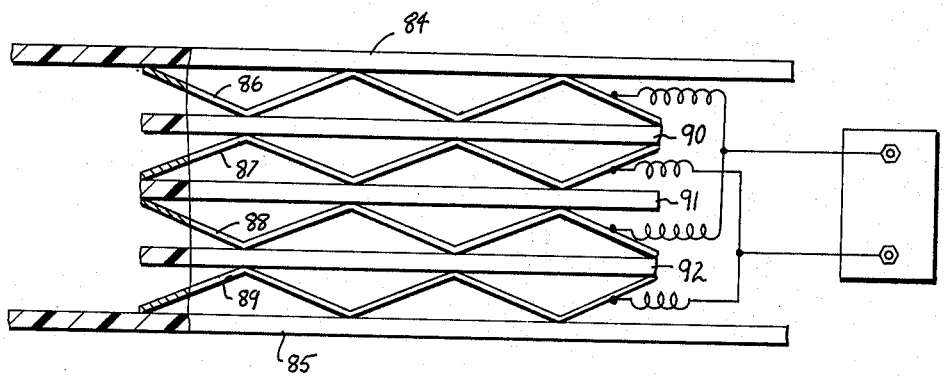
FIG. 6 is a cross-sectional view through still another variable capacitor according to a modification of the present invention.

In the system of FIG. 6, the housing portions 84, 85 may be moved toward one another and provided with indicating means as described with respect to the walls 14 and 15 of the housing of FIG. 1. In this case, however, the plates 86, 87, 88 and 89, while approaching one another at their apices, are separated by spacer members 90, 91, 92 of plate-like configuration. These insulating members permit the apices of the plates 86–89 to glide therealong as the assembly is compressed. The members 90–92 may thus be composed of a low-friction synthetic resin such as polytetrafluorethylene.

Figure 7:
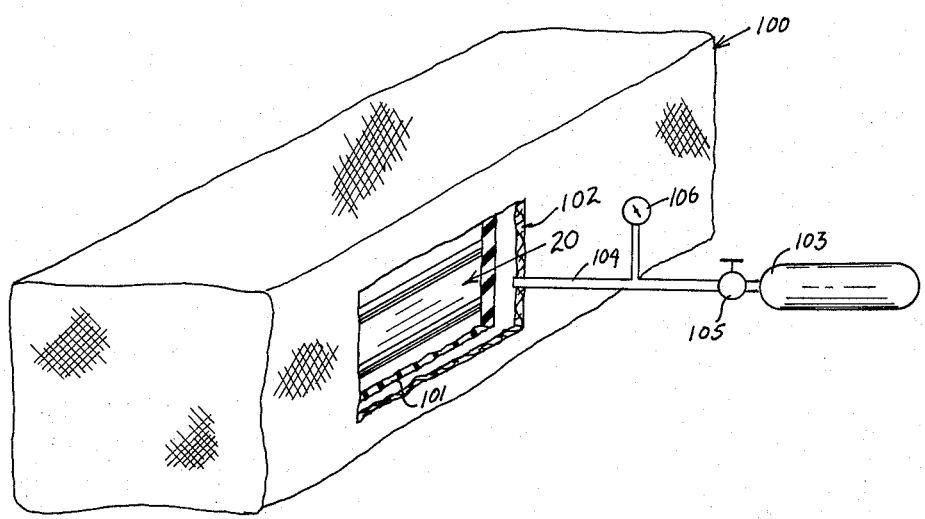
FIG. 7 is a perspective view, partly in section showing still another fluid-pressure-operated embodiment.

In the system of FIG. 7, the housing means is formed by a double-walled bladder 100 whose inner wall 101 may be of rubber and is flexible while the outer wall 102 may be formed from a rubber-coated fabric. The assembly 20 is received within the sleeve-like chamber formed by the inner bladder wall and can be selectively compacted or distended upon inflation of the housing 100 by fluid introduced under pressure between the walls from a source 103 connected to the bladder-like housing via a conduit 104. Gas within the chamber can be compressed as previously indicated or vented to the atmosphere. The conduit 104 is provided with a throttle valve 105 and a gauge 106 corresponding to the elements 67 and 68 described hereinabove.

*Example*

An assembly 20 of the type illustrated in FIG. 1 has its condenser plates composed of tantalum and of a thickness of 0.01 mm. Five plates (i.e. 8 juxtaposed, charge-retaining surfaces are provided with a length of 30 mm. and a width of 12 mm., with a pitch of the undulations along this length of 2.5 mm. The stack had a height of approximately 8 mm. with a peak height of 1.5 mm. so that the maximum width of each honeycombed chamber in an uncompacted state of the assembly was about 3 mm. Mechanical compaction of the assembly yielded a capacitance range from about 8 mmfd. to about 340 mmfd. at a measuring frequency of 4 megacycles/sec. and a potential of 32 volts.

It will be noted that capacitor assemblies of the type illustrated at 20 in the drawing may also be used in electronic detection devices as electromechanical transducers adapted to convert mechanical energy directly into a modification of an electrical parameter. Thus the assemblies can be provided for indication of fluid pressure, in electronic strain gauges and like systems without departing from the spirit and scope of the present invention as defined in the appended claims.

I claim:

1. A variable capacitor, comprising an assembly of stacked pairs of spacedly juxtaposed condenser plates, at least one of the plates of each pair being of generally wavy configuration with at least one complete undulation having a peak and a trough and approaching the other plate of each pair at spaced-apart locations; respective generally coplanar spacer members interposed between the plates of each pair at each of said locations for maintaining said plates in spaced relationship, said spacer members of each pair being displaceable relative to one another in their common plane; and capacitance-control means for selectively compressing and distending said assembly generally transversely to said planes, said capacitance-control means including at least one pressure member engageable with one of said plates of wavy configuration at an end of said assembly and extending over a plurality of peaks thereof, and means for displacing said pressure member perpendicular to said planes.

2. A variable capacitor, comprising an assembly of stacked pairs of spacedly juxtaposed condenser plates, each of the plates of each pair being of generally wavy configuration with at least one complete undulation having a peak and a trough and approaching the other plate of each pair at spaced-apart locations corresponding to peaks of one plate and troughs of the other plate of each pair; respective generally coplanar spacer members interposed between the plates of each pair at each of said locations for maintaining said plates in spaced relationship, said spacer members of each pair being displaceable relative to one another in their common plane; and capacitance-control means for selectively compressing and distending said assembly generally transversely to said planes, said capacitance-control means including at least one pressure member engageable with one of said plates of wavy configuration at an end of said assembly and extending over a plurality of peaks thereof, and means for displacing said pressure member perpendicular to said planes.

3. A variable capacitor, comprising an assembly of stacked pairs of spacedly juxtaposed condenser plates, each of the plates of each pair being of generally wavy configuration with at least one complete undulation having a peak and a trough and approaching the other plate of each pair at spaced-apart locations corresponding to peaks of one plate and troughs of the other plate of each pair; generally planar spacer means interposed between the plates of each pair at said locations for maintaining said plates in spaced relationship; and capacitance-control means for selectively compressing and distending said assembly generally transversely to said planes, said capacitance-control means including at least one pressure member engageable with one of said plates of wavy configuration at an end of said assembly and extending over a plurality of peaks thereof, and means for displacing said pressure member perpendicular to said planes.

4. A variable capacitor, comprising an assembly of stacked pairs of spacedly juxtaposed condenser plates, each of the plates of each pair being of generally undulating configuration and approaching the other plate of each pair at spaced-apart locations corresponding to peaks of one plate and troughs of the other plate of each pair at said locations for maintaining said plates in spaced relationship; capacitance-control means for selectively compressing and distending said assembly generally transversely to said planes; and housing means at least partly enclosing said assembly, said capacitance-control means including a source of pressure fluid communicating with said housing means for selectively compressing said assembly therein.

5. A variable capacitor as defined in claim 4 wherein the peak and trough portions of approaching plates at each of said locations are arcuately concave in the direction of one another and define seating surfaces for said members, said members being cylindrical rods of dielectric material received between the respective seating surfaces.

6. A variable capacitor as defined in claim 4, further comprising indicator means coupled with said capacitor-control means for providing a visual representation of the capacitance of the assembly, said indicator means including gauge means responsive to fluid pressure in said housing means for indicating the electrical capacitance of said assembly.

7. A variable capacitor as defined in claim 4 wherein said housing means includes an abutment engaging said assembly, further comprising a substantially rigid force-transmitting member extending parallel to said planes and spaced from said abutment, said assembly being sandwiched between said abutment and said force-transmitting member, said capacitance-control means further including a bladder in said housing means bearing upon said force-transmitting member, conduit means connecting said source with said bladder and throttle-valve means in said conduit means.

8. A variable capacitor as defined in claim 4 wherein said housing means is at least partly formed by a bladder enclosing said assembly, said capacitance-control means further including conduit means connecting said source with said bladder and throttle-valve means in said conduit means.

9. A variable capacitor as defined in claim 7 wherein said housing means is hermetically sealed and encloses a gas surrounding said plates and compressible upon inflation of said bladder.

10. A variable capacitor, comprising an assembly of stacked pairs of spacedly juxtaposed resiliently deformable condenser plates, each of the plates of each pair being of generally undulating configuration and approaching the other plate of each pair at spaced-apart locations corresponding to peaks of one plate and troughs of the other plate of each pair; respective generally coplanar spacer members interposed between the plates of each pair at each of said locations for maintaining said plates in spaced relationship, said spacer members of each pair being displaceable relative to one another in their common plane; capacitance-control means for selectively compressing and distending said assembly generally transversely to said planes; indicator means coupled with said capacitance-control means for providing a visual representation of the capacitance of the assembly; housing means at least partly enclosing said assembly and having an abutment engaging said assembly; and a substantially rigid force-transmitting member extending parallel to said planes and spaced from said abutment, said assembly being sandwiched between said force-transmitting member and said abutment, said capacitance-control means comprising mechanism for displacing said force-transmitting member toward said abutment, said force-transmitting member constituting a movable wall of said housing means engaging a plurality of peaks of one of said plates at one end of said assembly.

11. A variable capacitor as defined in claim 10 wherein said mechanism includes manually actuatable screw means engaging said movable wall for shifting same relatively to another wall of said housing means, said indicating means including a scale carried by one of said walls and index means co-operating with said scale on the other wall.

12. A variable capacitor, comprising an assembly of stacked pairs of spacedly juxtaposed resiliently deformable condenser plates, each of the plates of each pair being of generally undulating configuration and approaching the other plate of each pair at spaced-apart locations corresponding to peaks of one plate and troughs of the other plate of each pair; respective generally coplanar spacer members interposed between the plates of each pair at each of said locations for maintaining said plates in spaced relationship, said spacer members of each pair being displaceable relative to one another in their common plane; capacitance-control means for selectively compressing and distending said assembly generally transversely to said planes; indicator means coupled with said capacitance-control means for providing a visual representation of the capacitance of the assembly; housing means at least partly enclosing said assembly and having an abutment engaging said assembly; and a substantially rigid force-transmitting member extending parallel to said planes and spaced from said abutment, said assembly being sandwiched between said force-transmitting member and said abutment, said capacitance-control means comprising mechanism for displacing said force-transmitting member toward said abutment, said mechanism including a ramp in said housing means inclined toward said force-transmitting member but spaced therefrom, a plurality of rollers of different diameters spaced apart along said ramp and interposed between the latter and said force-transmitting member, and means including an element coupling said rollers for joint linear movement along said ram.

13. A variable capacitor as defined in claim 12 wherein said element is flexible, further comprising capacitance-indicating means including index means on said flexible element for co-operation with a scale to provide a visual indication of the extent of movement of said rollers.

References Cited by the Examiner

UNITED STATES PATENTS

| 1,616,093 | 2/1927 | Stein | 317—249 |
| 2,080,429 | 5/1937 | McNally | 317—249 |
| 2,438,476 | 3/1948 | Dodds | 317—249 X |
| 2,866,141 | 12/1958 | Frank | 317—261 X |
| 3,101,622 | 8/1963 | Grondahl | 317—255 X |

FOREIGN PATENTS

| 126,313 | 1/1932 | Austria. |
| 220,943 | 4/1925 | Great Britain. |
| 276,131 | 8/1927 | Great Britain. |
| 280,540 | 4/1952 | Switzerland. |

ROBERT K. SCHAEFER, *Primary Examiner.*

JOHN F. BURNS, *Examiner.*

E. GOLDBERG, *Assistant Examiner.*